(12) United States Patent
Ossadnik

(10) Patent No.: US 10,968,805 B2
(45) Date of Patent: Apr. 6, 2021

(54) MOTOR VEHICLE AND A METHOD FOR OPERATING A MOTOR VEHICLE

(71) Applicant: AUDI AG, Ingolstadt (DE)

(72) Inventor: Mark Ossadnik, Obersulm (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/397,137

(22) Filed: Apr. 29, 2019

(65) Prior Publication Data
US 2019/0368406 A1 Dec. 5, 2019

(30) Foreign Application Priority Data

Jun. 4, 2018 (DE) .......................... 102018208705.9

(51) Int. Cl.
*F01N 3/10* (2006.01)
*F01N 3/20* (2006.01)
(Continued)

(52) U.S. Cl.
CPC ............. *F01N 9/005* (2013.01); *F01N 3/106* (2013.01); *F01N 3/2013* (2013.01);
(Continued)

(58) Field of Classification Search
CPC .... F01N 13/009; F01N 3/0814; F01N 3/0842; F01N 3/106; F01N 3/18; F01N 3/2006;
(Continued)

(56) References Cited

U.S. PATENT DOCUMENTS

2010/0043404 A1 2/2010 Hebbale et al.
2015/0275730 A1* 10/2015 Gupta ................... F01N 3/0807
60/274

FOREIGN PATENT DOCUMENTS

CN 101655024 A 2/2010
CN 102935798 * 2/2013
(Continued)

OTHER PUBLICATIONS

Machine Translation DE 10 2016 224 430 (Year: 2020).*
(Continued)

*Primary Examiner* — Audrey K Bradley
*Assistant Examiner* — Dapinder Singh
(74) *Attorney, Agent, or Firm* — Maier & Maier, PLLC

(57) ABSTRACT

A motor vehicle including an exhaust system downstream of an internal combustion engine and which comprises several exhaust gas aftertreatment devices for cleaning the exhaust gas from the internal combustion engine, wherein the exhaust system includes an SCR catalytic converter and at least one additional catalytic converter, wherein the additional catalytic converter is designed as an NOx storage catalytic converter or an oxidation catalytic converter, wherein a control device is provided for controlling at least one operating component of the motor vehicle influencing the temperature of the exhaust gas, wherein the control device is designed to control the operating component for setting the temperature of the exhaust gas depending on at least route information dependent on an expected travel distance and conversion information relating to a temperature-dependent pollutant conversion rate of at least one exhaust gas aftertreatment device of the exhaust system.

19 Claims, 1 Drawing Sheet

(51) Int. Cl.
*F01N 9/00* (2006.01)
*F02D 41/02* (2006.01)
*B60K 6/40* (2007.10)

(52) U.S. Cl.
CPC ....... *F01N 3/2066* (2013.01); *F02D 41/0275* (2013.01); *B60K 6/40* (2013.01); *B60Y 2200/92* (2013.01); *F01N 2430/00* (2013.01)

(58) Field of Classification Search
CPC ...... F01N 3/2013; F01N 3/2066; F01N 3/208; F01N 9/00; F01N 9/005; F01N 2240/16; F01N 2430/00; F01N 2610/02; F01N 2900/10; F01N 2900/1404; F02D 41/0245; F02D 41/0275; F02D 41/1475; F02D 41/405
USPC ......... 60/274, 277, 286, 295, 297, 299–301, 60/311
See application file for complete search history.

(56) References Cited

FOREIGN PATENT DOCUMENTS

| | | |
|---|---|---|
| CN | 105370353 A | 3/2016 |
| DE | 202014003536 U1 | 7/2015 |
| DE | 102014216217 A1 | 2/2016 |
| DE | 10 2015 218 776 A1 | 3/2017 |
| DE | 102016222012 A1 | 6/2017 |
| DE | 102016224430 A1 | 6/2017 |
| KR | 20120011526 A | 2/2012 |

OTHER PUBLICATIONS

Machine Translation DE 10 2014 216 217 (Year: 2020).*
Machine Translation DE 20 2014 003 536 (Year: 2020).*
Machine Translation CN 102935798 (Year: 2020).*
Search Report dated Jul. 3, 2019 in corresponding European Application No. 19172781.7; 10 pages including partial machine-generated English-language translation.
German Examination Report dated Mar. 14, 2019 in corresponding German Application No. 102018208705.9; 24 pages.
Search Report dated Jul. 16, 2020 in corresponding European Application No. 19 172 781.7; 6 pages including partial machine-generated English-language translation.
Chinese Office Action dated Dec. 24, 2020, in connection with corresponding CN Application No. 201910476105.7 (44 pp., including machine-generated English translation).

* cited by examiner

MOTOR VEHICLE AND A METHOD FOR OPERATING A MOTOR VEHICLE

FIELD

The disclosure relates to a motor vehicle including an exhaust system downstream of an internal combustion engine and comprising several exhaust gas aftertreatment devices for cleaning the exhaust gas from the internal combustion engine, wherein the exhaust system includes an SCR catalytic converter and at least one additional catalytic converter, wherein the additional catalytic converter is designed as an NOx storage catalytic converter or an oxidation catalytic converter.

BACKGROUND

When operating internal combustion engines, in particular diesel engines, environmentally harmful and/or health-damaging substances, such as nitrogen oxides (NOx), carbon monoxide (CO), unburned hydrocarbons (CmHn) and soot particles are sometimes emitted. This creates the need for exhaust gases to be cleaned or undergo aftertreatment in the first place, before being emitted into the atmosphere. In some cases, legal limits have to be considered. Such aftertreatment or purification of the exhaust gas is generally done by exhaust gas aftertreatment devices, such as catalytic converters or particulate filters.

Oxidation catalytic converters are often used for this purpose, whereby carbon monoxide and unburned hydrocarbons are removed by the residual oxygen present in the exhaust gas. However, NOx storage catalytic converters are also frequently used to remove nitrogen oxides. These are operated in an initial phase (storage phase), wherein the nitrogen oxides are stored in storage components of the NOx storage catalytic converter. This can continue, until saturation of the memory components. Regeneration or discharge of the storage components then follows in a second phase (regeneration phase or rich operation). This means that the exhaust gas is "enriched," i.e., more fuel is injected than is burned in the combustion chamber of the internal combustion engine, such that the exhaust gas has an increased proportion of unburned hydrocarbons. Due to chemical reactions of the unburned hydrocarbons with the nitrogen oxides stored in the NOx storage catalytic converter, the storage components of the NOx storage catalytic converter are discharged.

What's more, SCR catalytic converters (SCR: selective catalytic reduction) may be used to remove nitrogen oxides. A urea solution (e.g., AdBlue®) is dosed through an injection unit and injected into the exhaust gas, before or as it enters the SCR catalytic converter. Chemical reactions then convert the nitrogen oxides in the SCR catalytic converter into carbon dioxide, elemental nitrogen, and water.

DE 10 2014 216 217 A1 discloses a method for reducing NOx emissions in the exhaust gases from an internal combustion engine of a motor vehicle. Here, an exhaust system downstream of the internal combustion engine comprises an NOx storage catalytic converter, an oxidation catalytic converter, and an SCR catalytic converter. Here, data relating to an expected travel distance are evaluated, whereby the regeneration and storage phases of the NOx storage catalytic converter and the dosing of the urea solution are controlled as a function thereof.

DE 10 2016 224 430 A1 discloses a method for the regeneration of an exhaust gas aftertreatment device. In particular, distance data is used for optimizing the regeneration phases using, e.g., an exhaust-gas heating device.

The object of the invention is to indicate a motor vehicle, in which particularly efficient cleaning of the exhaust gas takes place, in particular in terms of the overall pollutant conversion rate.

SUMMARY

This object is achieved by a motor vehicle of the type mentioned in the introduction, wherein an inventive control device for controlling at least one motor-vehicle operating component influencing the temperature of the exhaust gas is provided, wherein the control device is designed to control the operating component setting the temperature of the exhaust gas as a function of at least one instance of route information dependent on a travel distance and of conversion information relating to a temperature-dependent pollutant conversion rate of at least one exhaust gas aftertreatment device of the exhaust system.

One inventive use of predictive distance data, including temperature-dependent pollutant conversion rates, allows for time-resolved determination of the magnitude of the respective proportions of the converted pollutants of the exhaust gas for the respective exhaust gas aftertreatment device, and consequently the magnitude of the total pollutant conversion rate From this, it can be decided at which times or in which time intervals increasing the temperature of the exhaust gas by the operating component, in particular with regard to the total pollutant conversion rate, make sense. Thus, by influencing the temperature of the exhaust gas for a travel distance to be covered, an improvement of the total pollutant conversion rate is achievable.

The route information can be used for advance determination of the exhaust-gas temperature at a certain point in time and at a certain position in the exhaust system. Here, the route information can be acquired from data provided by a GPS-based navigation system. In this context, in particular, information relating to the route and the elevation of the expected travel distance are relevant. Moreover, any speed restrictions and/or the current traffic situation may conceivably be considered.

Furthermore, in addition to route information, information regarding who will be driving may also be used for control purposes. For example, very pronounced acceleration phases and a resulting increase in the temperature of the exhaust gas are rather atypical of a more restrained driver. When beginning the drive, the driver can, e.g., be automatically identified, as driver information may have been previously stored for the respective driver, on the basis of which the control may take place.

Route information is now used together with conversion information regarding temperature-dependent pollutant conversion rates in order to control the operating component. Typical temperature dependencies for pollutant conversion rates of the above catalytic converter types are well known. In particular, tables or numerical models are often used for this purpose. It then follows, for example, that the optimal operating temperature of an SCR catalytic converter is greater than that of an NOx storage catalytic converter, which is typically about 200° C. or above. It should be noted that the operating temperature relates not only to the temperature of the exhaust gas, but also to that of the catalytic converter itself, whereby a change in the temperature of the exhaust gas naturally influences the temperature of the catalytic converter on account of thermal conduction processes.

The operating component influencing the temperature of the exhaust gas may be any device of the motor vehicle capable of influencing the temperature of the exhaust gas. In particular, the operating component is meant to be part of the exhaust system or may be combined with an exhaust-gas aftertreatment device of the drive train.

The internal combustion engine, which may be designed in particular as a diesel engine, is part of a drive train. A drive train refers to all the components, which serve to transmit the torque of the internal combustion engine to the tires. The drive train may in particular include clutches, transmissions and differentials, as well as other components. The exhaust gases generated by the internal combustion engine are carried through the exhaust system downstream of the internal combustion engine, before being discharged into the environment. Here, the exhaust gases may initially be conveyed to an exhaust turboloader associated with the internal combustion engine, and which serves to increase the performance of the internal combustion engine. Further downstream in the exhaust system, an additional catalytic converter designed as an NOx storage catalytic converter or oxidation catalytic converter may be provided. The exhaust gas subsequently passes through the SCR catalytic converter, which may be designed as an SRC-coated soot or diesel-particulate filter. Moreover, a dosing unit for the urea solution may be provided immediately before or within the SCR catalytic converter, whereby enrichment of the exhaust gas with the urea solution may be done.

In one exemplary embodiment, the motor vehicle can be designed as a hybrid vehicle. In this case, in addition to the internal combustion engine, an electric machine or an electric motor is additionally provided in the drive train in order to drive the motor vehicle. In this exemplary embodiment, control of the operating component may also advantageously take place, while taking hybrid information into account. In particular, the time intervals, at which the vehicle is powered by the electric machine or electric motor and the internal combustion engine, may be taken into account. In this context, low exhaust gas temperatures can be expected, in particular when the hybrid vehicle switches from electric-motor to internal-combustion-engine drive. In particular, the control device may also designed such that selection of the electromotive and internal-combustion engine drive of the motor vehicle is done in order to avoid unfavorable temperature conditions of the exhaust gas in relation to the total pollutant conversion rate.

The control device may be designed to control the operating component depending on at least one model, which models the temperature of the exhaust gas along the exhaust system, as well as the temperature of the exhaust gas as a function of at least one variable relating to the driving operation, and/or at least one instantaneous sensor-detected temperature. It can be determined in advance, based on the route information, what the requirements on the drive train will be at a certain time. Thus, the expected exhaust gas temperature can be determined at this point in time. The requirements for the exhaust system or the expected exhaust gas temperatures are determined, e.g., via a model. This model allows the exhaust gas temperature to be modeled continuously along the exhaust system and at each point thereof. However, since the conversion of the pollutants by the respective exhaust gas aftertreatment devices takes place at the respective positions in the exhaust system, local or point values for the temperature of the exhaust gas are typically sufficient or relevant for controlling the component. The use of similarly simplified models may thus be advantageous.

Alternatively or in addition, it may be provided that measured values relating to the instantaneous exhaust-gas temperature are detected at one or more points of the exhaust system and transmitted to the control device. Control of the operating component may then advantageously be carried out additionally depending on these measured values. Furthermore, modeling of the temperature of the exhaust gas may also take place via these sensor-acquired data. Especially advantageously, the measured values can be detected continuously while driving and used to control the operating component and/or model the temperature of the exhaust gas in the exhaust system.

For the inventive motor vehicle, it can further be provided that the exhaust system additionally has an underbody SCR-catalytic converter. It may be arranged in the exhaust system downstream of the SCR catalytic converter. Moreover, the underbody SCR-catalytic converter may be associated with a further urea-solution dosing unit. The urea content of the exhaust gas for the SCR catalytic converter and the underbody SCR catalytic converter may thus be adjusted separately. The fact that the underbody SCR catalytic converter is equipped with a further exhaust gas aftertreatment device for the exhaust system means that the exhaust gas can be purified even more efficiently. In addition, the temperature-dependent pollutant conversion rate of the underbody SCR catalytic converter differs from that of the SCR catalytic converter and the NOx storage catalytic converter, in that that more efficient overall pollutant conversion rates are achieved, e.g., at higher exhaust temperatures.

It may also be provided that the operating component controlled by the control device for setting the temperature of the exhaust gas is the internal combustion engine per se. In particular, it may be provided that the temperature of the exhaust gas is set by adjusting the combustion position of the internal combustion engine and/or using post-injections and/or adjusting the combustion air ratio.

Alternatively or in addition, it may be provided that the operating component controlled by the control device for setting the temperature of the exhaust gas is a heating device within the exhaust system. The heating device may in particular be designed as an electrically heatable disc in thermal contact with the exhaust gas in the exhaust system. Moreover, it is conceivable that the electrically heatable disc is in thermal contact with the additional catalytic converter. In this case, the heating device not only heats indirectly the exhaust gas, but also the material of the additional catalytic converter. This is particularly advantageous in that the temperature-dependent pollutant conversion rates of the exhaust gas aftertreatment devices are not only dependent on the temperature of the exhaust gas alone, but also on the temperature of the exhaust gas aftertreatment device itself. This aspect may be included in the control of the operating component.

The control device may be adapted to select the respective operating component depending on a first instance of efficiency information relating to the efficiency of the heating of the exhaust gas by the internal combustion engine and a second instance of efficiency information relating to the efficiency of the heating of the exhaust gas by the or a heating device. The efficiency of the exhaust gas heating describes how much energy is needed to heat the exhaust gas and, if needed, the respective catalytic converter and the operating component from a lower temperature $T_L$ to an upper temperature $T_U$. Corresponding characteristic maps for the heating of the exhaust gas by internal engine measures, as well as by similar heating devices, are well known. If, for example, the route information and the conversion information show that the exhaust gas is to be heated from $T_L$ to $T_U$ at a certain time, then the characteristic maps may be used to determine how much energy is needed for heating by the internal-engine measure, as well as the heating device. The method requiring the lower energy is advantageously used. Ultimately, this comparison can lead to advantageous energy and fuel savings.

If the operating component actuated by the control device is a heating device in the exhaust system, a belt-starter generator may be provided, wherein the mechanical energy of the internal combustion engine can be converted to electrical energy, which can be used to operate the operating component. This yields the advantage that, e.g., during operation of the operating component, no load will be placed on the vehicle electrical system or a starter battery of the motor vehicle, which is particularly desirable with low outside temperatures. Furthermore, this represents a savings of installation space, as the belt-starter generator for starting the internal combustion engine is usually pre-installed in the motor vehicle anyway.

A further development provides for raising the load point of the internal combustion engine, while mechanical energy of the internal combustion engine is converted to electrical energy. When raising the load point of the internal combustion engine, combustion of more fuel creates more torque than is needed for vehicle propulsion. The "excess" amount of torque can be used for the generation of electrical energy by the belt-starter generator used to operate the operating component. This yields the advantage that the drive performance of the vehicle does not necessarily need to be reduced during the period, in which the mechanical energy of the internal combustion engine is converted to electrical energy. This will ensure consistent driving behavior of the motor vehicle.

An energy storage device may also be provided, in which recuperated energy may be stored for operating the operating component. This makes it possible for the energy, which is used to operate the operating component, to be generated advantageously before heating of the exhaust gas takes place. Thus, for example, when driving downhill or during braking action, kinetic energy of the motor vehicle can be converted by recuperation into electrical energy and stored in the energy storage device. The energy storage device may be, e.g., the energy storage device, in which the energy required to drive the vehicle is stored, provided the vehicle is designed as a hybrid vehicle.

For a motor vehicle according to the invention, it may be provided that the control device is adapted to control at least one further motor vehicle operating component influencing the regeneration and charging operation of the NOx storage catalytic converter depending on the route information and/or at least storage information relating to the NOx storage catalytic converter. As already explained, the NOx storage catalytic converter must be discharged in the event that it is fully charged and therefore unable to absorb further pollutants. Here, the control device may be designed to use the already existing route information, [and] moreover, control the regeneration and charging operation of the NOx storage catalytic converter. In particular, it can be determined at what time the NOx storage catalytic converter needs to be discharged. If electromotive operation of the motor vehicle is planned at point, it may be advisable to advance rich operation in time. In particular, rich operation may then take place in a phase, in which the motor vehicle is powered by an internal combustion engine. The storage information relating to the NOx storage catalytic converter may relate, in particular, to the remaining storage capacity of the NOx storage catalytic converter at a particular time.

In addition, it may also be provided that the modeled and/or detected exhaust gas temperatures are taken into account for controlling the regeneration and charging operation of the NOx storage catalytic converter, given that the efficiency of the regeneration process of the NOx storage catalytic converter is also temperature-dependent.

The invention further relates to a method for operating a motor vehicle comprising an internal combustion engine generating an exhaust gas and an exhaust system comprising several exhaust gas aftertreatment devices and located downstream of the internal combustion engine, wherein the exhaust system comprises an SCR catalytic converter and at least one additional catalytic converter, and the additional catalytic converter is designed as an NOx storage catalytic converter or an oxidation catalytic converter. The method is characterized in that at least one operating component of the motor vehicle influencing the temperature of the exhaust gas is controlled, wherein the operating component setting the temperature of the exhaust gas is controlled as a function of at least route information, which is dependent on an expected travel distance, and conversion information relating to a temperature-dependent pollutant conversion rate of at least one exhaust gas aftertreatment device of the exhaust system.

In the method according to the invention, it may be provided that the operating component is controlled as a function of at least one model, which models the temperature of the exhaust gas along the exhaust system, as well as the temperature of the exhaust gas as a function of at least one variable relating to the driving operation and/or of at least one instantaneous sensor-detected temperature.

Moreover, it may be provided that the operating component, which is controlled in order to adjust the temperature of the exhaust gas, is the internal combustion engine and/or a heating device in the exhaust system per se.

Furthermore, the respective operating component may be selected depending on a first instance of efficiency information relating to the efficiency of the heating of the exhaust gas by the internal combustion engine and a second instance of efficiency information relating to the efficiency of the heating of the exhaust gas by the or a heating device.

The method according to the invention may provide that the operating component is operated by the electrical energy of a belt-starter generator, which converts mechanical energy of the internal combustion engine into electrical energy, and/or an energy storage device, in which recuperated energy is stored. In particular, the load point of the internal combustion engine can be raised here, while the mechanical energy of the internal combustion engine is converted to electrical energy by the belt-starter generator.

For a motor vehicle according to the invention, it may also be provided that at least one further operating component of the motor vehicle influencing the regeneration and charging phases of the NOx storage catalytic converter is controlled depending on the route information and/or at least storage information relating to the NOx storage catalytic converter.

All features and advantages of the motor vehicle according to the invention can be transferred to the method according to the invention.

BRIEF DESCRIPTION OF THE DRAWINGS

Further advantages and details of the invention will become clear from the exemplary embodiments described below, and with reference to the drawings. Schematically in the drawings.

DETAILED DESCRIPTION

Figure 1:
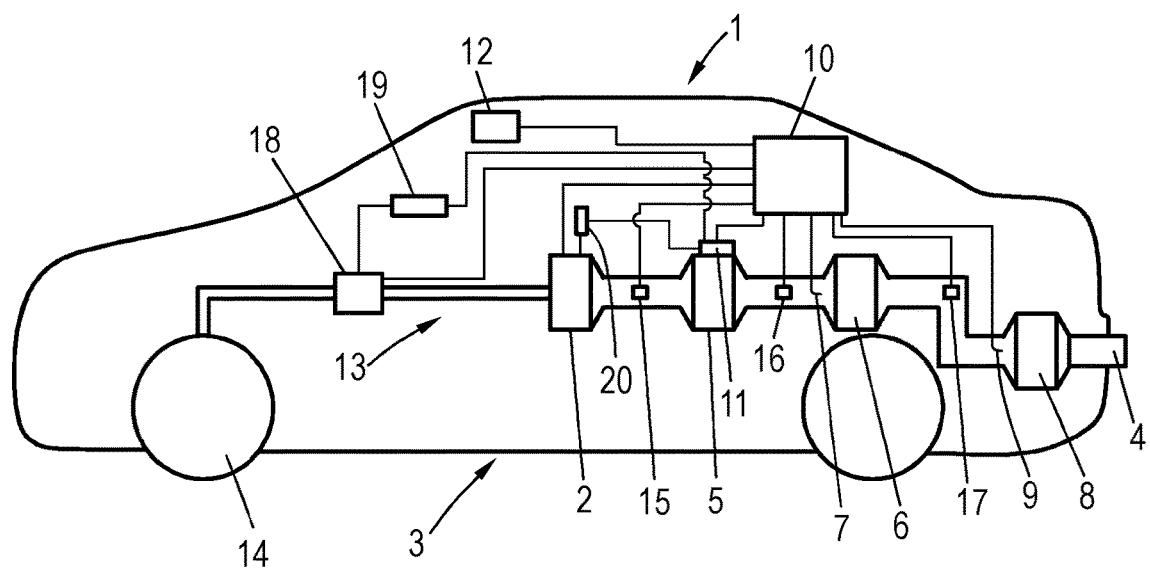
FIG. 1 is a view of an exemplary embodiment of a motor vehicle according to the invention.

FIG. 1 shows a schematic view of a motor vehicle 1 including an internal combustion engine 2 designed as a diesel engine, including an exhaust system 3 downstream of the internal combustion engine 2. Exhaust gas generated by the internal combustion engine 2 is conveyed through the exhaust system 3 for the purification of pollutants and finally discharged into the environment via an exhaust pipe 4.

The exhaust system 3 comprises a additional catalytic converter 5 arranged downstream of the internal combustion engine 2, and designed as an NOx storage catalytic converter. Alternatively, it is conceivable for the additional catalytic converter 5 instead to be designed as an oxidation catalytic converter. The additional catalytic converter 5 designed as an NOx storage catalytic converter comprises storage components (not shown), in which nitrogen oxides (NOx) of the exhaust gas are stored, thereby purifying the latter. If the storage components of the additional catalytic converter 5 designed as an NOx storage catalytic converter are completely laden with NOx, then a regeneration phase of the NOx storage catalytic converter must take place before further nitrogen oxides can be stored therein. During the regeneration phase, more fuel is injected than is burned in the combustion chamber of the internal combustion engine 2, such that the exhaust gas is "enriched," i.e., enriched with a higher proportion of unburned hydrocarbons. The nitrogen oxides stored in the additional catalytic converter 5 designed as an NOx storage catalytic converter react with these unburned hydrocarbons, while discharging the storage components. The resulting substances, such as carbon dioxide, elemental nitrogen and water can then be emitted into the environment.

An SCR catalytic converter 6 (SCR: selective catalytic reduction) is provided further downstream in the exhaust system 3. A urea solution is injected into the exhaust gas via a dosing unit 7, which is designed as a nozzle. Thus, nitrogen oxides are ultimately converted to harmless substances in the SCR catalytic converter 6 and finally released into the environment. Between the SCR catalytic converter 6 and the exhaust pipe 4, an underbody SCR catalytic converter 8 with a further dosing unit 9 injecting the urea solution into the exhaust gas is provided in the exhaust system 3 In principle, however, the underbody SCR catalytic converter 8 is not completely necessary for the motor vehicle 1 according to the invention, although the exhaust gas can only be cleaned extensively in the exhaust system 3 with the SCR catalytic converter 6 and the additional catalytic converter 5.

A control device 10 of the motor vehicle 1 controls a heating device 11 designed as a heating disc, as well as the internal combustion engine 2, each of which represents an operating component, which influences the temperature of the exhaust gas.

Control takes place depending on route information, which is dependent on an expected travel distance, whereby the relevant data are transmitted from a GPS-based navigation system 12 to the control device 10. Furthermore, the control takes place as a function of conversion information relating to temperature-dependent pollution conversion rates of the additional catalytic converter 5 designed as a NOx storage catalytic converter, the SCR catalytic converter 6, and the underbody SCR catalytic converter 8. Each of these three exhaust gas aftertreatment devices 5, 6, 8 has a maximum pollutant conversion rate at a typical temperature.

Figure 2:
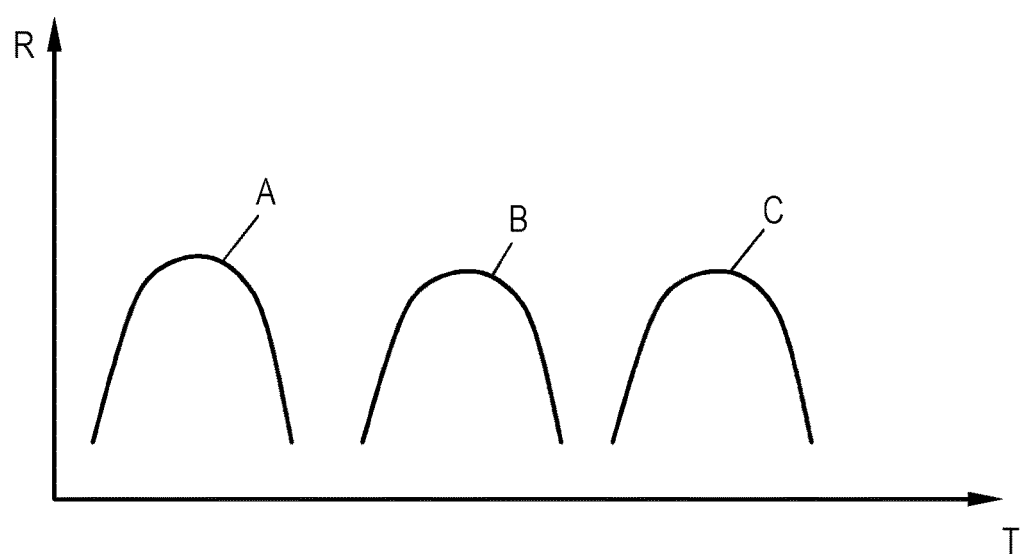
FIG. 2 shows the pollutant conversion rates of separate exhaust gas aftertreatment devices of the motor vehicle according to the invention in FIG. 1 and as a function of the temperature.

A schematic view of the pollutant conversion rates of the exhaust gas aftertreatment devices 5, 6, 8 varying with the respective operating temperature is shown in FIG. 2. The pollutant conversion rate refers to the conversion of nitrogen oxides. Here, curve A shows the pollutant conversion rate of an NOx storage catalytic converter, curve B that of the SCR catalytic converter 6, and curve C that of the underbody SCR catalytic converter 8. This shows that the optimal pollutant conversion rate of the NOx storage catalytic converter 5 is at a lower temperature than is the case for the SCR catalytic converter 6. In contrast, the optimal pollutant conversion rate of the underbody SCR catalytic converter 8 is at high temperature compared to the other two components 5, 6.

Based on the route information, control device 10 in advance determines a torque to be applied by the internal combustion engine 2 at each point in time of the route. In addition to the route, the height profile of the route, the current traffic situation, speed restrictions and individual driver information are also taken into account. The temperature of the exhaust gas in the exhaust system 3 may be modeled based on the torque to be provided by the internal combustion engine 2. Alternatively, however, it is also conceivable that the temperature of the exhaust gas in the exhaust system 3 is modeled directly based on route information without first determining the torque of the internal combustion engine 2 to be applied. In either case, especially numerical models may be used for this purpose.

The temperature sensors 15, 16, 17 are also provided In the exhaust system 3, and are located upstream of the additional catalytic converter 5, the SCR catalytic converter 6 and the underbody SCR catalytic converter 8, respectively. The temperature sensors 15, 16, 17 continuously transmit to the control device 10 measured data relating to the temperature of the exhaust gas in the exhaust system 3, i.e., at intervals of, e.g., one second. These data represent further input variables for the model, from which the temperature of the exhaust gas in the exhaust system 3 is determined.

The model, from which the temperature of the exhaust gas in the exhaust line 3 is determined, provides that the temperatures in the exhaust line 3 is determined only at three discrete locations, i.e., on or in the additional catalytic converter 5, the SCR catalytic converter 6 and the underbody SCR catalytic converter 8. It is conceivable that the temperature curve of the exhaust gas is determined continuously for the whole exhaust system 3, but this would not be necessary for the present purpose.

Based on the modeled values for the temperature of the exhaust gas, as well as the conversion information relating to the temperature-dependent pollutant conversion rates for the additional catalytic converter 5, the SCR catalytic converter 6 and the underbody SCR catalytic converter 8, the control device 10 performs an pre-calculation of the expected total pollutant conversion rate. If this falls below a preset limit, then it is provided for the relevant time period that the exhaust gas is heated by actuating the internal combustion engine 2 or the heating device 11, such that the overall pollutant conversion rate is improved. The model, with predetermines the temperature of the exhaust gas, naturally takes into account heating of the exhaust gas by the internal combustion engine 2 and the heating device 11.

The motor vehicle 1 is designed as a hybrid vehicle. Thus, the motor vehicle 1 may be powered by the internal combustion engine 2, as well as an electric machine 18, which likewise is a component of the drive train 13. The electrical machine 18 draws the energy required for driving the motor vehicle from an electrical energy storage device 19. Based on the route information, the control device 10, furthermore, controls the time intervals, at which the motor vehicle 1 is powered by the internal combustion engine 2 and the electric machine 18. This information is also taken into account, when determining the temperature of the exhaust gas in the exhaust system 3. For example, whenever the motor vehicle 1 transitions from electromotive to internal-combustion-engine drive, comparatively low exhaust gas temperatures in the exhaust system 3 are to be expected. In contrast, the periods in which the motor vehicle 1 is powered by the internal combustion engine and electromotively are also controlled based on the temperatures of the exhaust gas in the exhaust system 3. Consequently, particularly unfavorable situations in terms of the overall pollutant conversion rate can be avoided.

As mentioned above, heating of the exhaust gas is done by the internal combustion engine 2 and/or the heating device 11. The heating of the exhaust gas by the internal combustion engine 2 is realized by internal engine measures, i.e., by adjusting the combustion position, using post-injections, or adjusting the combustion air ratio, as examples thereof. The exhaust gas is heated by the heating device 11, since the heating device 11 is in thermal contact with the additional catalytic converter 5.

Keep in mind that the relevant pollutant conversion rates depend not only on the temperature of the exhaust gas, but also on the temperature of the exhaust gas aftertreatment device itself. As for the illustrated exemplary embodiment, this means that when the exhaust gas is heated by the heating device 11, the additional catalytic converter 5, which is designed as an NOx storage catalytic converter, is heated directly by the heating device 11, whereas when the exhaust gas is heated by the internal combustion engine 2, the additional catalytic converter 5 is heated only after a time delay, since exhaust gas thermal energy must first be released to the additional catalytic converter 5 for this purpose. Such effects are of course accounted for, when the temperature of the exhaust gas or the total conversion rate are modelled.

Furthermore, selection of whether the exhaust gas should be heated by internal engine measures or the heating device 11 is made based on the relevant efficiency information. If, for example, the exhaust gas is to be heated from a lower temperature $T_L$ to an upper temperature $T_U$ at a specific time, then the energy required for this heating process can be determined for both heating methods using existing efficiency characteristic maps. It is then advisable to choose the heating method for heating the exhaust gas which uses less energy. This means energy and fuel savings.

The internal combustion engine 2 is coupled to a belt-starter generator 20, such that the belt-starter generator 20 converts mechanical energy of the internal combustion engine 2 into electrical energy, which in turn can be used to operate the heating device 11. During this process, the load point of the internal combustion engine 2 is raised. This means that the power provided by the internal combustion engine 2 is greater than the power currently required for propelling the motor vehicle 1. The resultant excess power is used to operate the heating device 11. This has the advantage that when the heating device 11 is operated, there will be no drop in the power provided for the propulsion of the motor vehicle 1. The heating device 11 can alternatively or in addition be operated by energy from the electrical energy storage device 19. This is particularly useful in situations when not operating the heating device 11, In other words, the kinetic energy of motor vehicle 1 is converted to electrical energy, in particular when driving downhill or braking, by operating the electrical machine 18 as a generator, whereby the energy is stored in the electrical energy storage device 19. This energy can then be used at a later point in order to operate the heating device 11.

Moreover, the control device 10 controls the operation of the internal combustion engine 2 or the heating device 11 depending on when the additional catalytic converter, which is designed as an NOx storage catalytic converter 5, undergoes regeneration or charging phases. Conversely, the regeneration and charging phases of the additional catalytic converter 5, which is designed as an NOx storage catalytic converter, are naturally also controlled depending on the temperature of the exhaust gas in the exhaust system 3 or the route information. In particular, it may be taken into account that during the regeneration phase, a certain minimum operating temperature of the additional catalytic converter 5, which is designed as an NOx storage catalytic converter, must be present, as only then regeneration will take place.

The invention claimed is:

1. A motor vehicle comprising:
   an exhaust system downstream of an internal combustion engine, which exhaust system includes several exhaust gas aftertreatment devices for cleaning an exhaust gas of the internal combustion engine, wherein the exhaust system further comprises an SCR catalytic converter and at least one additional catalytic converter, and wherein the additional catalytic converter is designed as an NOx storage catalytic converter or an oxidation catalytic converter;
   a control device is provided for controlling at least one operating component of the motor vehicle that influences the temperature of the exhaust gas, wherein the control device is designed to control the operating component to set the temperature of the exhaust gas as a function of (1) a driving style of an identified manual driver of the motor vehicle, (2) at least one instance of route information dependent on an expected travel distance, and (3) one instance of conversion information relating to a temperature-dependent pollutant conversion rate of at least one exhaust gas aftertreatment device of the exhaust system; and
   a belt-starter generator, provided to start the internal combustion engine, wherein the operating component is operated using electricity generated from mechanical energy of the internal combustion engine via the belt-starter generator.

2. The motor vehicle according to claim 1, wherein the control device is designed to control the operating component depending on at least one model, which models the temperature of the exhaust gas along the exhaust system and models the temperature of the exhaust gas depending on at least one variable relating to the driving operation, and/or at least one instantaneous sensor-detected temperature.

3. The motor vehicle according to claim 1, wherein the exhaust system additionally has an underbody SCR catalytic converter.

4. The motor vehicle according to claim 1, wherein the operating component controlled by the control device for setting the temperature of the exhaust gas is the internal combustion engine.

5. The motor vehicle according to claim 4, wherein the control device is designed to select the respective operating component depending on a first instance of efficiency information relating to the efficiency of the heating of the exhaust gas by the internal combustion engine and a second instance of efficiency information relating to the efficiency of the heating of the exhaust gas by the or a heating device.

6. The motor vehicle according to claim 1, wherein the operating component controlled by the control device for setting the temperature of the exhaust gas is a heating device in the exhaust system.

7. The motor vehicle according to any of claim 6, wherein an energy storage device is provided, in which recuperated energy may be stored for operating the operating component.

8. The motor vehicle according to claim 1, wherein a load point of the internal combustion engine may be raised, while mechanical energy of the internal combustion engine is converted to electrical energy.

9. The motor vehicle according to claim 1, wherein the control device is set up to actuate at least one further operating component of the motor vehicle that influences the regeneration and charging operation of the or an NOx storage catalytic converter, depending on the route information and/or at least one instance of storage information relating to the NOx storage catalytic converter.

10. A method for operating a motor vehicle comprising:
generating an exhaust gas via an internal combustion engine,
   wherein the internal combustion engine is provided with an exhaust system including several exhaust gas aftertreatment devices and located downstream of the internal combustion engine, wherein the exhaust system further comprises an SCR catalytic converter and at least one additional catalytic converter, and the additional catalytic converter is designed as an NOx storage catalytic converter or an oxidation catalytic converter;
   controlling at least one operating component of the motor vehicle influencing the temperature of the exhaust gas, wherein the operating component is controlled to set the temperature of the exhaust gas depending on (1) a driving style of an identified manual driver of the motor vehicle, (2) at least one instance of route information, which is dependent on an expected travel distance, and (3) one instance of conversion information relating to a temperature-dependent pollutant conversion rate of at least one exhaust gas aftertreatment device of the exhaust system; and
generating electricity from mechanical energy of the internal combustion engine via a belt-starter generator, which is provided to start the internal combustion engine, wherein electricity thus generated is used to operate the at least one operating component.

11. The method according to claim 10, wherein the operating component is controlled depending on at least one model, which models the temperature of the exhaust gas along the exhaust system and which models the temperature of the exhaust gas depending on at least one variable relating to the driving operation, and/or depending on at least one instantaneous sensor-detected temperature.

12. The method according to claim 11, wherein at least one additional operating component of the motor vehicle influencing the regeneration and charging phases of the NOx storage catalytic converter is controlled depending on the route information and/or at least one instance of storage information relating to the NOx storage catalytic converter.

13. The method according to claim 10, wherein the operating component that is actuated in order to set the temperature of the exhaust gas is the internal combustion engine and/or a heating device in the exhaust system.

14. The method according to claim 13, wherein the respective operating component is selected depending on a first instance of efficiency information relating to the efficiency of the heating of the exhaust gas by the internal combustion engine and on a second instance of efficiency information relating to the efficiency of the heating of the exhaust gas by the or a heating device.

15. The method according to claim 14, wherein at least one additional operating component of the motor vehicle influencing the regeneration and charging phases of the NOx storage catalytic converter is controlled depending on the route information and/or at least one instance of storage information relating to the NOx storage catalytic converter.

16. The method according to claim 13, wherein at least one additional operating component of the motor vehicle influencing the regeneration and charging phases of the NOx storage catalytic converter is controlled depending on the route information and/or at least one instance of storage information relating to the NOx storage catalytic converter.

17. The method according to claim 10, wherein the operating component is operated by electrical energy of an energy storage device which stores electricity generated from recuperating kinetic energy when braking or driving the motor vehicle downhill.

18. The method according to claim 17, wherein at least one additional operating component of the motor vehicle influencing the regeneration and charging phases of the NOx storage catalytic converter is controlled depending on the route information and/or at least one instance of storage information relating to the NOx storage catalytic converter.

19. The method according to claim 10, wherein at least one additional operating component of the motor vehicle influencing the regeneration and charging phases of the NOx storage catalytic converter is controlled depending on the route information and/or at least one instance of storage information relating to the NOx storage catalytic converter.

* * * * *